United States Patent [19]
Okano

[11] Patent Number: 5,854,712
[45] Date of Patent: Dec. 29, 1998

[54] LENS BARREL WITH HIGHER FOCUSING ACCURACY

[75] Inventor: Hiroshi Okano, Tokyo, Japan

[73] Assignee: Nikon Corporation, Tokyo, Japan

[21] Appl. No.: 896,024

[22] Filed: Jul. 17, 1997

[30] Foreign Application Priority Data

Sep. 9, 1996 [JP] Japan .................................. 8-237448

[51] Int. Cl.$^6$ .................................................. G02B 7/02
[52] U.S. Cl. ........................ 359/823; 359/826; 359/700; 359/701
[58] Field of Search .................................... 359/819, 823, 359/826, 694, 699, 700, 701, 704, 703

[56] References Cited

U.S. PATENT DOCUMENTS

5,528,430  6/1996  Hamasaki ................................ 359/701

Primary Examiner—Loha Ben
Attorney, Agent, or Firm—Morgan, Lewis & Bockius LLP

[57] ABSTRACT

A lens barrel comprising a first member formed with a guide groove, and a second member having a main protrusion inserted into the guide groove and moving relative to the first member along the guide grove by moving the main protrusion within the guide groove. The lens barrel further comprises a displacement protrusion provided in a position, different from a position provided with the main protrusion, on the second member in a direction perpendicular to the guide groove. The displacement protrusion is inserted into the guide groove and contacts one side surface of the guide groove, thereby removing a play between the main protrusion and the guide groove.

17 Claims, 4 Drawing Sheets

FORWARD IN THE OPTICAL AXIS

FORWARD IN THE
OPTICAL AXIS

LENS BARREL WITH HIGHER FOCUSING ACCURACY

This application claims the benefit of Japanese Application No. 8-237448 which is hereby incorporated by reference.

BACKGROUND OF THE INVENTION

1. Field of the Invention

The present invention relates to a lens barrel constructed to move an optical system along a guide groove by moving a protruded portion within the guide groove.

2. Related Background Art

In a conventional lens barrel, a part of a photographing optical system (which part is herein termed a "lens unit") is moved back and forth in an optical-axis direction by use of a cam mechanism. The cam mechanism is constructed of, e.g., a cam pin provided on an outer periphery of a lens moving frame for holding the lens unit, a rectilinear advancement guide groove, formed in a member unrotated about the optical axis, for guiding the inserted cam pin in the optical-axis direction, and a cam groove, formed in a cam drum rotating about the optical axis, for moving the cam pin in the optical-axis direction.

In the cam mechanism described above, a width of the cam pin is normally slightly smaller than a width of the rectilinear advancement guide groove enough to form a play or clearance between the cam pin and the rectilinear advancement guide groove. This clearance affects the operating accuracy of the cam mechanism and the optical performance of the lens barrel.

A potential solution to this problem is to reduce the clearance formed between the cam pin and the rectilinear advancement guide groove by making the width of the cam pin substantially the same as the width of the corresponding groove. This solution, however, requires an extremely high working accuracy and as a result, causes an increase in price of the lens barrel. Therefore, the need exists for a method of easily removing the clearance of play between the rectilinear advancement guide groove and the cam pin.

SUMMARY OF THE INVENTION

A first object of the present invention is to enhance optical characteristics of a lens barrel by removing a clearance or play between a protrusion and a guide groove.

To accomplish the above object, according to one aspect of the present invention, a lens barrel comprises a first member formed with a guide groove, and a second member having a main protrusion inserted into the guide groove and moving relative to the first member along the guide groove as the main protrusion moves within the guide groove. The second member includes a displacement protrusion positioned in a direction orthogonal to a direction in which the guide groove extends. The position is different from the position where the main protrusion is provided in the extending direction of the guide groove. The play between the main protrusion and the guide groove is eliminated by inserting the displacement protrusion into the guide groove and contacting the displacement protrusion with a side surface of the guide groove.

According to another aspect of the present invention, a lens barrel comprises a first member formed with a guide groove, and a second member having a main protrusion inserted into the guide groove and moving relative to the first member along the guide groove as the main protrusion moves within the guide groove. The second member further has an auxiliary protrusion that is inserted into the guide groove. An area of the guide groove, into which the auxiliary protrusion is inserted, extends in a direction perpendicular to the extending direction of the guide groove where the main protrusion is inserted. The auxiliary protrusion contacts a side surface of the guide groove and thereby removes the play between protrusion and the guide groove.

According to still another aspect of the present invention, a lens barrel is constructed such that at least one of the displacement protrusion and the guide groove is composed of an elastic member, or alternatively, at least one of the auxiliary protrusion and the guide groove is composed of an elastic member.

It is a second object of the present invention to provide a lens barrel in which the second member is prevented from rotating with respect to the first member.

To accomplish the second object, according to the present invention, the first member has at least one pair of guide grooves. The displacement protrusions inserted respectively into the pair of guide grooves are provided in positions on the second member, in which directions of forces received from the side surfaces of said grooves are offset each other.

It is a third object of the present invention to provide a lens barrel capable of minimizing the amount of a play of the protrusion within the guide groove.

To accomplish the third object, according to the present invention, in the lens barrel, guide grooves are provided so that their side surfaces are either parallel or perpendicular to the perpendicular direction in a main attitude of a camera.

It is a fourth object of the present invention to provide a lens barrel that easily obtains an accuracy of a width dimension of the guide groove.

To accomplish the fourth object, according to the present invention, in the lens barrel, the guide groove is a rectilinear advancement groove parallel to the optical axis. The rectilinear advancement groove has a first area, into which the main protrusion is inserted, with substantially the same groove width as a width of the main protrusion. The rectilinear advancement groove has a second area, into which the displacement protrusion is inserted, with a groove width larger than the first area and extending to an end portion of the first member in the optical-axis direction.

BRIEF DESCRIPTION OF THE DRAWINGS

The objects and advantages of the present invention will become apparent during the following description in conjunction with the accompanying drawings, in which.

DESCRIPTION OF THE PREFERRED EMBODIMENTS

Embodiments of the present invention will hereinafter be described in greater details with reference to the drawings.

Figure 1:
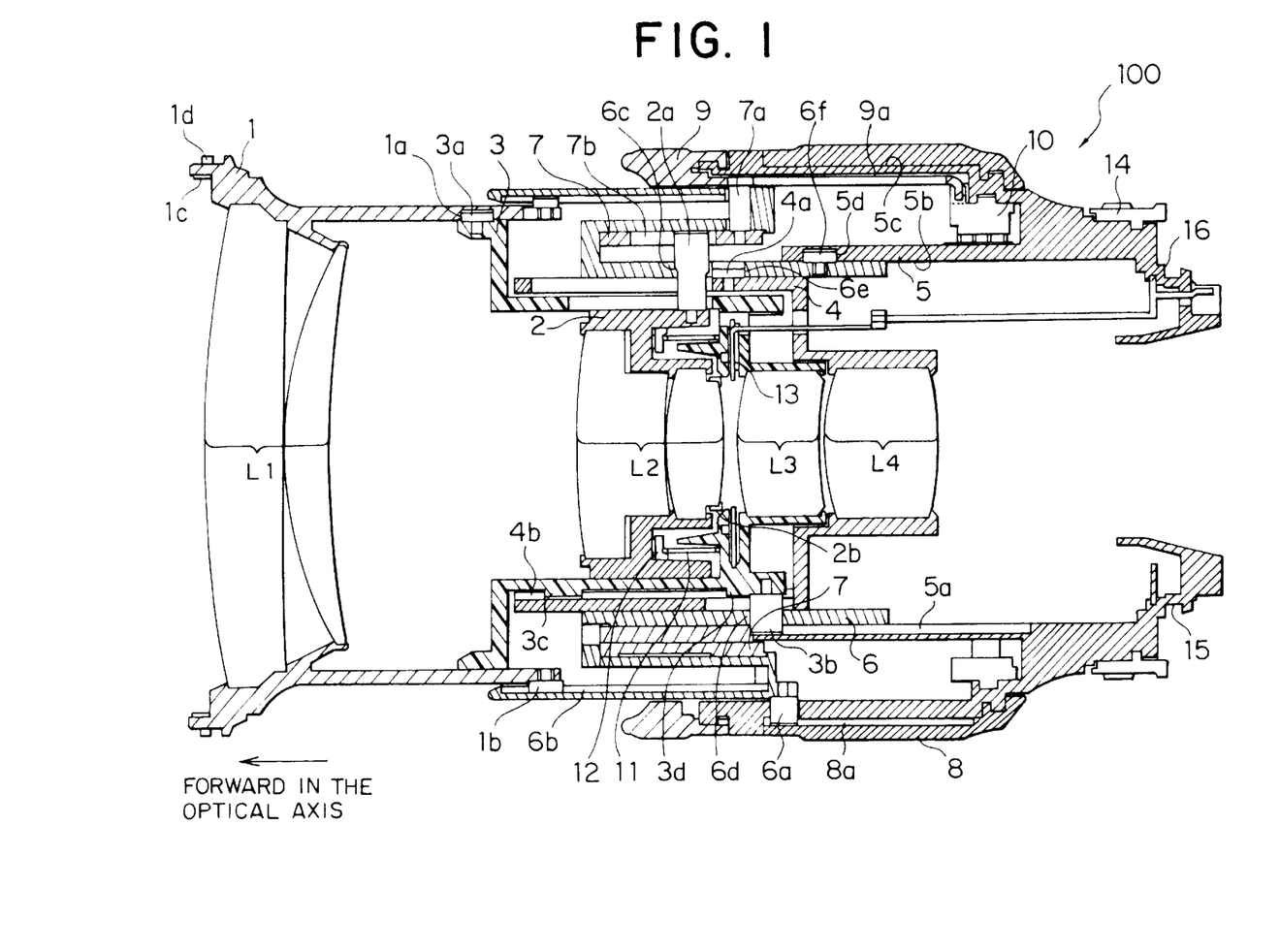
FIG. 1 is a sectional view illustrating a first embodiment of the present invention.

Referring to FIG. 1, a sectional view of a lens barrel according to the present invention is shown.

A lens barrel 100 in the first embodiment includes a photographing optical system constructed of four lens units, including a first lens unit L1, a second lens unit L2, a third lens unit L3, and a fourth lens unit L4. The respective lens units are held by lens unit moving frames, including a first lens unit moving frame 1, a second lens unit moving frame 2, a third lens unit moving frame 3, and a fourth lens unit moving frame 4, each corresponding to a lens unit. The lens units moving the lens frames are moved back and forth in an optical-axis direction.

Further, the above photographing optical system is of a convex-lens front type having a convex lens, a concave lens, and a convex lens that are disposed in this order from an object side of the system. Zooming is performed by changing an air spacing between the convex optical element unit and the concave optical element unit. Also, the second lens unit L2, defined as the concave optical element unit, is classified as a focusing lens unit for controlling an in-focus state of the photographing optical system. The photographing optical system in the first embodiment is an inner focus type optical system.

The first lens unit moving frame 1 is held along an outer periphery of the third lens unit moving frame 3. Further, the first lens unit moving frame 1 includes a filter fitting screw 1c and an attachment fitting portion 1d on the front side thereof. Moreover, the first lens unit moving frame 1 has a cam 1a formed on an inner peripheral surface thereof. A pin 3a is provided on an outer peripheral portion of the third lens unit moving frame 3 and engages the cam 1a.

On the other hand, a cam pin 1b is provided on the outer periphery of the first lens unit moving frame 1. The cam pin 1b engages a guide groove 6b formed in a cam drum 6 which will be discussed later. Three cam pins 1b are provided and each is disposed at an equal interval about the optical axis, i.e., at an equal angle with the optical axis centered. Thus, the cam pins 1b are disposed in a plurality of positions. With this arrangement, in accordance with the first embodiment, a variation in shape of the first lens unit moving frame 1, even when one of the cam pins 1b disengages from the guide groove 6b, prevents the first lens unit moving frame 1 from coming off the lens barrel 100.

The second lens units moving frame 2 is held along the inner periphery of the third lens unit moving frame 3. The second lens unit moving frame 2 has a pin 2a for transmitting a driving force generated by focusing. The pin 2a penetrates clearance grooves formed respectively in the third lens unit moving frame 3, the fourth lens unit moving frame 4, and a fixed drum 5. The pin 2a engages a cam groove 6c formed in the cam drum 6 and a rectilinear advancement guide groove 7b that is formed in a focus interlocking drum 7 which will be described later.

A light shielding member 2b is an annular frame member formed with a circular aperture transmitting photographic light beams, and fitted to an outer periphery of the last lens of the second lens unit L2. The light shielding member 2b restricts the beam height of photographic light beams down to ½ of an inside diameter of where the same light shielding member 2b is fitted. The light shielding member 2b thereby prevents harmful light beams from reaching a photographic surface. The light shielding member 2b held by the second lens unit L2 does not hold other members, and therefore is molded thinly since strength is not needed. Accordingly, the light shielding member 2b never interferes with a stop mechanism provided at the third lens unit moving frame 3 even when the second lens unit moving frame 2 moves back in the optical-axis direction.

The third lens unit moving frame 3 held along the inner periphery of the fourth lens unit moving frame 4, as described above, holds the second lens unit moving frame 2 on an inner peripheral surface thereof as well as the first lens unit moving frame 1 at a front edge thereof. Further, the third lens unit moving frame 3 is provided with a pin 3b on its outer periphery. The pin 3b penetrates a clearance groove formed in the fourth lens unit moving frame 4, and engages a cam groove 6d formed in the cam drum 6 and a rectilinear advancement guide groove 5a formed in the fixed drum 5. Further, eight protrusions 3c–3j are provided on the outer periphery of the third lens unit moving frame 3. Preferably, the third lens unit moving frame 3 is formed of a plastic material in the first embodiment.

The fourth lens unit moving frame 4 is held along the inner periphery of the cam drum 6. The fourth lens unit moving frame 4 includes a pin 4a on its outer periphery. This pin 4a engages a cam groove 6e formed in the cam drum 6. Moreover, the fourth lens unit moving frame 4 includes four grooves 4b–4e formed parallel to the optical axis, in the inner periphery thereof. The protrusions 3c–3j of the third lens unit moving frame 3 engage grooves 4b–4e, which are defined as rectilinear advancement guide grooves for guiding the third lens unit moving frame 3 in the optical-axis direction. Note that the protrusions 3c–3j and the grooves 4b–4e will be explained in much greater detail in reference to FIG. 2.

The fixed drum 5 is attached directly to the camera body (not shown) and includes a bayonet mount 15, provided at its rear end, for a connection to the camera body.

The cam drum 6 has a guide groove 6b for giving a rotary driving force to the first lens unit moving frame 1, and cam grooves 6c–6e for moving and positioning the second through fourth lens unit moving frames 2–4. The cam drum 6 is held along an inner peripheral surface 5b of the fixed drum 5 as to be rotatable about the optical axis. Further, the cam drum 6 has a pin 6f and a pin 6a on an outer periphery thereof. The pin 6f engages the cam groove 5d formed in the inner periphery of the fixed drum 5. The pin 6a penetrates a clearance groove of the fixed drum 5 and engages with a zoom operation ring 8 which will be described later.

The focus interlocking drum 7 is a cylindrical member provided along the inner periphery of the cam drum 6. The focus interlocking drum 7 is rotatable about the optical axis with respect to both the cam drum 6 and the fixed drum 5. The focus interlocking drum 7 has a guide groove 7b parallel to the optical axis, with which the pin 2a engages. If the focus interlocking drum 7 does not rotate, the guide groove 7b functions as a rectilinear advancement guide groove. Further, when the focus interlocking drum 7 is rotated, its rotary motion is transmitted via the pin 2a and the guide groove 7b to the second lens unit moving frame 2.

The zoom operation ring 8 is an annular member that is manually rotatable to control a focal length, and is rotatably attached to an outer periphery 5c of the fixed drum 5. The zoom operation ring 8 has a guide groove 8a formed parallel to the optical axis in its inner peripheral surface. A pin 6a provided on the cam drum 6 engages with the guide groove 8a.

The manual focus ring 9 is an annular member that is manually rotated to focus the optical system. The manual focus ring 9 is fitted to a front end of the fixed drum 5 using a bayonet, and is rotatable through a predetermined angle. Further, the manual focus ring 9 has a rectilinear advancement guide groove 9a formed in the inner periphery, which is engaged by a pin 7a that is provided on the outer periphery of the focus interlocking drum 7 and penetrating the clearance groove of the cam drum 6.

A gear member 10 is a member to which an unillustrated camera body transmits the driving force to execute autofocusing. The gear member 10 is rotatable and is provided on an inner periphery surface of the fixed drum 5. The gear member 10 meshes with an unillustrated coupler and a small gear as well. Further, a brush member is provided on an inner peripheral portion of the gear member 10. This brush member slides on an encoder secured to the fixed drum 5, thereby detecting a position of the second lens unit L2.

A spring member 11 is a compressed coil disposed between the second lens unit L2 and the third lens unit L3. Moreover, a spring holding frame 12 is included to hold the spring member 11.

The second lens unit L2 receives a force acting forward in the optical-axis direction from the spring member 11. As a result, backlash between the pin 2a provided in the second lens unit L2 and a cam groove 6c is eliminated.

On the other hand, the third lens unit L3 receives a force acting backward in the optical-axis direction from the spring member 11. Therefore, the backlash between the pin 3b of the third lens unit L3 and the cam groove 6d is eliminated.

A stop diaphragm interlocking plate 16 is connected to an interlocking plate on the side of the camera body (not shown) and works to transmit the power thereof. The stop diaphragm interlocking plate 16 engages the inner peripheral surface of the fixed drum 5, and a front end thereof is connected to a stop diaphragm drive plate 13 and a stop ring 14 that constitute a known stop mechanism in the third lens moving frame 3.

Figure 2:
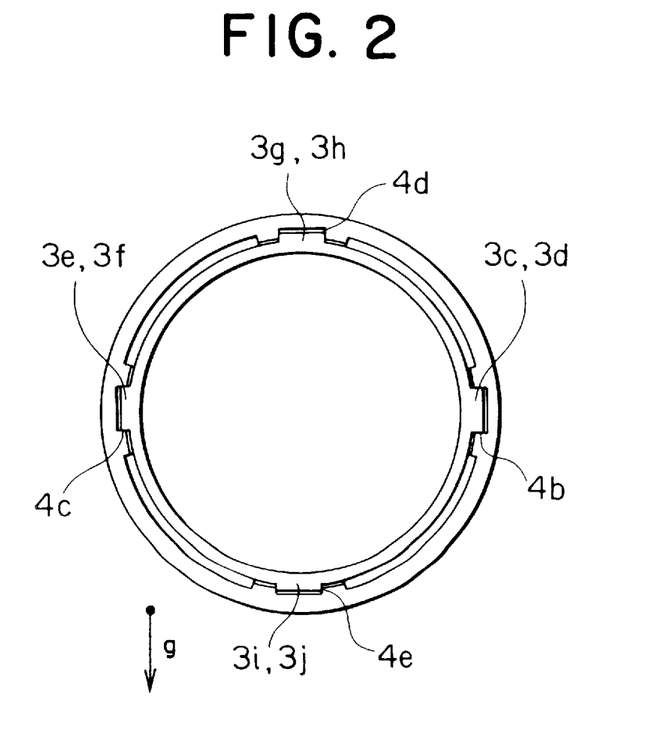
FIG. 2 is a sectional view taken along the plane perpendicular to an optical axis of third and fourth lens unit moving frames in a first embodiment of the present invention.
Figure 3:
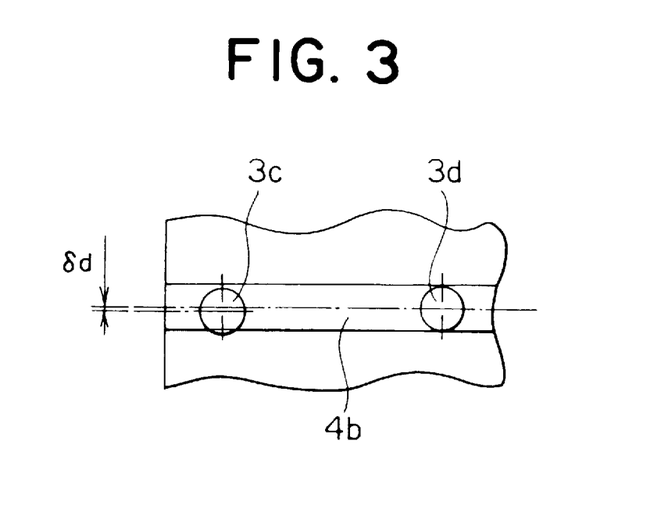
FIG. 3 is a view showing the engagement between protrusions of the third lens unit moving frame and a groove of the fourth lens unit moving frame in the first embodiment of the present invention.

FIG. 2 is a sectional view taken along the plane perpendicular to the optical axis of the third and forth lens moving frames 3, 4. FIG. 3 is a view illustrating the engagement between the protrusions 3c, 3d of the third lens unit moving frame 3 and the groove 4b of the fourth lens unit moving frame 4.

As previously explained, the fourth lens unit moving frame 4 has four grooves 4b–4e. The grooves 4b–4e are disposed so that grooves 4b, 4c are positioned in a direction substantially horizontal to the optical axis, and that grooves 4d, 4e are positioned in a direction substantially perpendicular to the optical axis when the camera is, as shown in FIG. 2, held in a normal photographic attitude (a main attitude of the camera). The reason why the grooves 4b–4e are disposed in such positions is that the play between the grooves and the protrusions engaging these grooves may be minimized by setting side surfaces of the respective grooves vertical or parallel to the perpendicular direction.

Figure 4A:
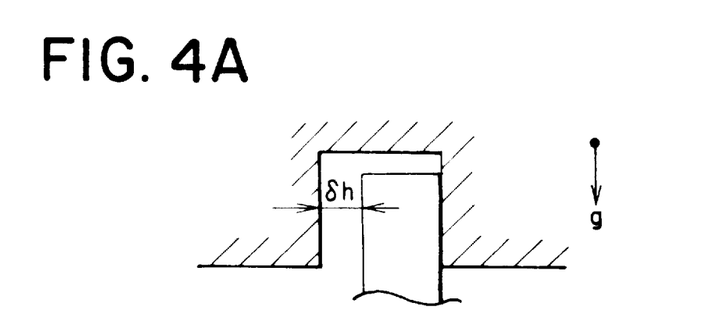
FIG. 4A–4C are schematic diagrams showing the relationship between the orientation of the groove in the gravitational direction and the relative size of the protrusion engaging, groove.
Figure 4B:
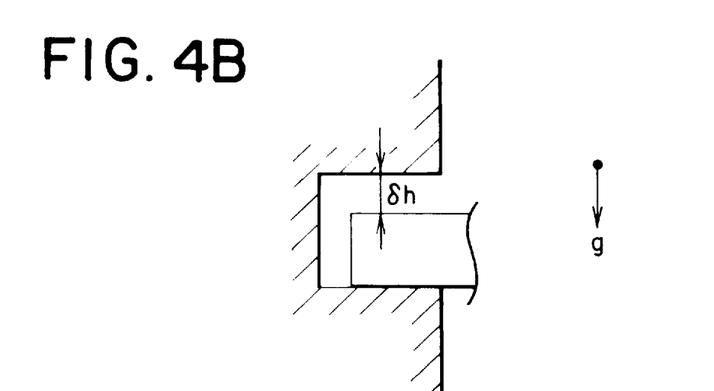
Figure 4C:
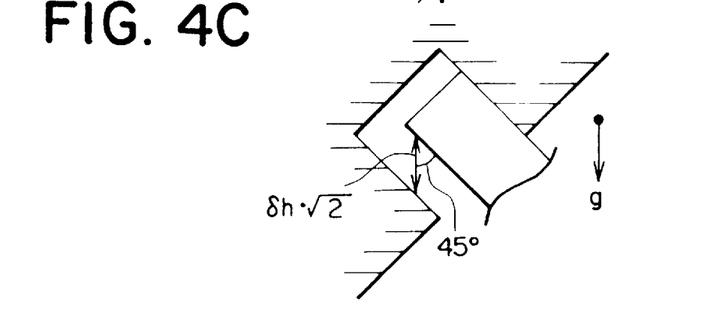

FIGS. 4A and 4B are sectional views showing grooves vertical or parallel to the gravitational direction. FIG. 4C is a sectional view illustrating a groove with its side surface intersecting the gravitational direction at an angle of 45°. Referring to FIGS. 4A–4C, a protrusion having a width narrower by δh than a groove width is inserted into each of these grooves. The protrusion inserted therein moves within the groove while receiving an influence of the gravity. In the case of FIG. 4C, however, the protrusion moves in a direction inclined at 45° to the side surface of the groove, and therefore moves a quantity that is √2 times as large as the original play or clearance δh.

On the other hand, in FIGS. 4A and 4B, the moving direction of the protrusion is vertical or parallel to the side surface of the groove, and therefore the protrusion never moves farther than the original clearance δh. In summary, in accordance with this embodiment, the disposition of the grooves 4b–4e are optimized to minimize substantial dimensions of the plays or clearances of the protrusions 3c–3j when the camera takes the main attitude.

As shown in FIG. 2, two protrusions spaced away from each other in the optical-axis direction engage with the grooves 4b–4e extending parallel to the optical axis. For instance, the protrusions 3c, 3d (3e, 3f, 3g, 3h, and 3i, 3j) engage with the groove 4b (4c, 4d, and 4e) respectively.

One protrusion 3d (3f, 3h, 3j) of the two protrusions engaging with the corresponding groove 4b (4c, 4d, 4e) is provided in a position on the third lens unit moving frame 3 corresponding to the central line of the groove 4b (4c, 4d, 4e). On the other hand, the protrusion 3c (3e, 3g, 3i) situated more forward in the optical-axis direction than the protrusion 3d (3f, 3h, 3j), is provided in a position on the third lens unit moving frame 3 a distance δd from the protrusion 3d (3f, 3h, 3j) in the rotating direction about the optical axis as shown in FIG. 3.

Accordingly, when the protrusions 3c, 3d are simultaneously inserted, the protrusion 3c is pushed against one side surface of the groove 4b. Since the third lens unit moving frame 3 is composed of an elastic plastic material, the protrusion 3c acts like a spring. As a result, the clearance or play between the groove 4b and the protrusion 3d is absorbed by the protrusion 3c, and the protrusion 3d does not cause backlash in the groove 4b. Then, the third and fourth lens unit moving frames 3 and 4 become integral with a high accuracy in the rotating direction about the optical axis.

Further, in accordance with this embodiment, the direction of the above-mentioned displacement δd is set different between the protrusions 3c, 3i adjacent to each other and the protrusions 3e, 3g in the face-to-face positions with these protrusions 3c, 3i, with the optical axis middled therebetween. That is to say, the protrusions 3c, 3i are displaced in the clockwise direction in FIG. 2, while the protrusions 3e, 3g are displaced in the counter-clockwise direction in FIG. 2. The direction of force exerted by the protrusions 3c, 3d (3i, 3j) upon the third lens unit moving frame 3, is thereby opposite to the direction of force exerted by the protrusions 3e, 3f (3g, 3h), and these two quantities of forces offset each other. Accordingly, the central axis of the third lens unit moving frame 3 is not inclined to the optical axis by the spring action of the protrusion 3c (3e, 3i, 3g).

Next, the operation of this embodiment will be explained. First, a case where focusing is carried out in an autofocusing mode in this embodiment is explained.

In the autofocusing mode, a driving force in the rotation direction is transmitted to the gear member 10 shown in FIG. 1 via a known power transmission mechanism (not shown). Next, the driving force is transmitted to the focus interlocking drum 7 via the pin 7a from the manual focus ring 9, thereby rotating the focus interlocking drum 7. As the tip of the pin 2a engages with the guide groove 7b of the focus interlockingly drum 7, the pin 2a rotates interlocking with the focus interlocking drum 7 and moves within the cam groove 6c. As a result, the second lens unit moving frame 2 moves back and forth in the optical-axis direction, thus performing the focusing process.

On the other hand, when executing the focusing process in a manual focusing mode, the manual focus ring 9 is manually rotated. The rotary motion of the manual focus ring 9 is converted into a motion acting in the optical-axis direction of the second lens unit moving frame 2 by the same mechanism and the same operation as those in the autofocusing mode.

Next, an operation of adjusting a focal length in this embodiment will be explained.

When adjusting the focal length, the zoom operation ring 8 is manually rotated. The rotary motion of the zoom operation ring 8 is transmitted via the guide groove 8a and the pin 6a to the cam drum 6, and the cam drum 6 rotates interlockingly with the zoom operation ring 8. As a result, the cam drum 6 moves in the optical-axis direction while rotating along the cam groove 5d.

The rotary motion of the cam drum 6 is converted into a rectilinear advancing motion in the optical-axis direction by a set of the cam groove 6c and the pin 2a, a set of the cam groove 6d and the pin 3b, and a set of the cam groove 6e and the pin 4a. In consequence, the respective lens unit moving frames (2, 3, 4) for the second, third, and fourth lens units move back and forth in the optical-axis direction without rotating. Note that a movement of the second lens unit moving frame 2 is determined by the movement of the cam groove 5d and the movement of the cam groove 6c. Further, the movement of the fourth lens unit moving frame 4 is determined by the movement of the cam groove 5d and the movement of the cam groove 6e.

On the other hand, the first lens unit frame 1 is integral with the cam drum 6 in the rotating direction about the optical axis through the cam pin 1b and the guide groove 6b. Therefore, the first lens unit moving frame 1 rotates with the cam drum 6. The rotary motion of the first lens unit moving frame 1 is converted into a motion in the optical-axis direction by the cam 1a and the pin 3a. As a result, the first lens unit moving frame 1 moves back and forth in the optical-axis direction while rotating. Note that the pin 3a is provided on the third lens unit moving frame 3, and hence the movement of the first lens unit moving frame 1 at this time is determined by the movement of cam 1a, the movement of the cam groove 6d, and the movement of the cam groove 5d.

In accordance with this embodiment, in addition to the protrusion 3d (3f, 3h, 3j), the protrusion 3c (3e, 3g, 3i) provided in the position displaced a distance δd from the protrusion 3d in the rotating direction about the optical axis engages with the groove 4b (4c, 4d, 4e) of the fourth lens unit moving frame 4 as shown in FIG. 3. Consequently, the protrusion 3c contracts one side surface of the groove 4b enough to absorb the clearance of the protrusion 3d with respect to the groove 4b. Since the protrusion 3c has elasticity, the clearance or play of the protrusion 3d is effectively absorbed.

As previously discussed, the direction of the above-mentioned displacement δd is set different between the protrusions 3c, 3i and the protrusions 3e, 3g in the face-to-face positions with these protrusions 3c, 3i, with the optical axis middled therebetween. Accordingly, the force received by the third lens unit moving frame 3 from the protrusions 3c, 3d, 3i, 3j is offset by the force received from the protrusions 3e, 3f, 3g, 3h. As a result, the central axis of the third lens unit moving frame 3 never slants to the optical axis.

Next, a second embodiment of the lens barrel according to the present invention will be described. Incidentally in the following discussion, the same portions performing the same functions as those in the first embodiment are marked with the same numerals, and the repetitive explanations are properly omitted.

Figure 5:
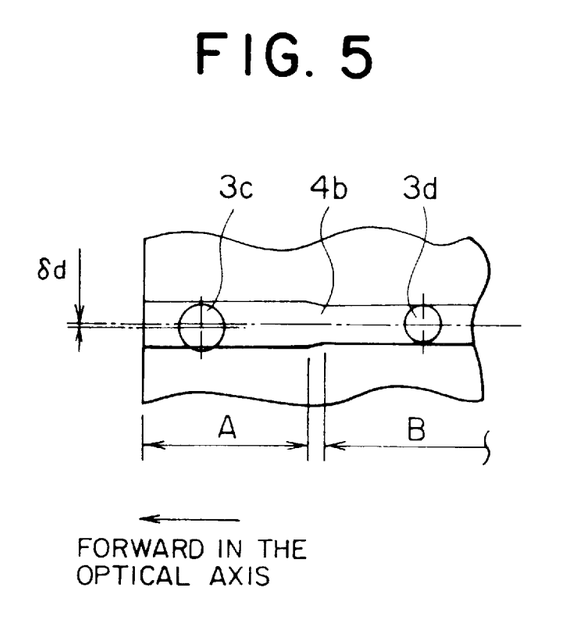
FIG. 5 is a view showing the engagement between protrusions of the third lens unit moving frame and a groove of the fourth lens unit moving frame in a second embodiment of the present invention.

FIG. 5 is a view showing how the protrusions 3c, 3d of the third lens unit moving frame 3 engage with the grooves 4b of the fourth lens unit moving frame 4 in the second embodiment.

The second embodiment is different from the first embodiment in that the groove 4b has two areas A, B each having a different groove width. In other words, in the groove 4b in accordance with the second embodiment, the groove width of the area A containing protrusion 3c is set larger than the groove width of the area B where the protrusion 3d exists.

Thus, the arrangement of groove 4b with the two areas A, B having the different groove widths intends to substantially reduce a length of the groove 4b in terms of facilitating highly accurate groove working.

In general, when working a tapered groove having a fixed width or a fixed angle, the working accuracy is harder to maintain as the total length of the groove becomes larger.

On the other hand, in accordance with the second embodiment, the two protrusions 3c, 3d are disposed in the groove 4b, hence the groove 4b has a tendency to inevitably become elongated. Accordingly, if the groove width of the groove 4b as a whole is fixed, an extremely high accuracy is demanded, and a possibility arises in which the cost for manufacturing the lens barrel might increase.

Such being the case, in the second embodiment, paying attention to the fact that the protrusion 3c displaces in a direction of the groove width in comparison with the protrusion 3d, the groove width of the area containing the protrusion 3c is set larger than an original groove width thereof, and the groove 4b comprises the two areas whose lengths are substantially small. With this construction as shown in FIG. 5, in the second embodiment, it is feasible to obtain the accuracy of the width dimension of the groove 4b relatively easily.

Note that the present invention is not limited to the embodiments discussed above. The embodiments given above are exemplifications, and any constructions having substantially the same construction as those defined by the technical concepts claimed in the appended claims of the present invention and exhibiting the same operations and effects, are embraced in the technical scope of the present invention.

For instance, in the embodiments discussed above, the third lens unit moving frame 3 is formed of a plastic material, thereby providing the protrusion 3c with elasticity. This may be changed such that the fourth lens unit moving frame 4 is moved of the plastic material, thus giving the elasticity to the groove 4b. Further, both of the third and fourth lens unit moving frames 3, 4 may be formed of plastic materials, thus giving them both elasticity.

Moreover, instead of the protrusion being displaced, the position of the groove may be displaced. More specifically, the area where the protrusion 3c is inserted in the groove 4b may be displaced by δd in the direction perpendicular to the groove 4b from the position of the area where the protrusion 3d is inserted according to the embodiments of the invention.

What is claimed is:

1. In a lens barrel comprising:

a first member formed with a guide groove; and a second member having a main protrusion inserted into said guide groove and moving relative to said first member along said guide groove by moving said main protrusion within said guide groove, the improvement comprising a displacement protrusion provided in a position on said second member and in a position displaced in a direction orthogonal to a direction in which said guide groove extends, the positions being different from the position where said main protrusion is provided in the extending direction of said guide groove, and said displacement protrusion being inserted into said guide groove and being in contact with one side surface of said guide groove, thereby a play of said main protrusion with respect to said guide groove being removed.

2. The lens barrel according to claim 1, wherein said first member is a first barrel member, and said second member is a second barrel member fitted to said first barrel member, said respective first and second members holding lenses.

3. The lens barrel according to claim 1, wherein at least one of said displacement protrusion and a portion of the first member defining said guide groove is composed of an elastic member.

4. The lens barrel according to claim 1, wherein said first member has at least one pair of guide grooves, and wherein the second member has at least two displacement protrusions, the displacement protrusions inserted respectively into the guide grooves and provided in positions on said second member in which directions of forces received from the side surfaces of said guide grooves offset each other.

5. The lens barrel according to claim 1, wherein the first member has at least one guide groove provided so that the side surfaces thereof are parallel or perpendicular to the perpendicular direction in a main attitude of a camera.

6. The lens barrel according to claim 1, wherein said guide groove is a rectilinear advancement groove parallel to an optical axis, and said rectilinear advancement groove has a first area, into which said main protrusion is inserted, having substantially the same groove width as a width of said main protrusion, and a second area, into which said displacement protrusion is inserted, having a groove width larger than said first area and extending to an end portion of said first member in the optical-axis direction.

7. A lens barrel comprising:

a first member formed with a guide groove; and a second member having a main protrusion inserted into said guide groove and moving relative to said first member along said guide groove by moving said main protrusion within said guide groove, wherein said second member further has an auxiliary protrusion insertable into said guide groove, an area of said guide groove, into which said auxiliary protrusion is inserted, displaces in a direction perpendicular to an extending direction of said guide groove with respect to an area into which said main protrusion is inserted, and said auxiliary protrusion contacts one side surface of said guide groove displaced and thereby removes a play of said main protrusion with respect to said guide groove.

8. The lens barrel according to claim 7, wherein said first and second members are first and second barrel members and respectively support lenses.

9. The lens barrel according to claim 7, wherein at least one of said auxiliary protrusion and a portion of the first member defining said guide groove is composed of an elastic member.

10. The lens barrel according to claim 7, wherein said first member has at least one pair of guide grooves, and wherein the second member has at least two displacement protrusions, the displacement protrusions inserted respectively into the guide grooves and provided in positions on said second member in which directions of forces received from the side surfaces of said guide grooves offset each other.

11. The lens barrel according to claim 7, wherein the first member has at least one guide groove provided so that the side surfaces thereof are parallel or perpendicular to the perpendicular direction in a main attitude of a camera.

12. The lens barrel according to claim 7, wherein said guide groove is a rectilinear advancement groove parallel to an optical axis, and said rectilinear advancement groove has a first area, into which said main protrusion is inserted, having substantially the same groove width as a width of said main protrusion, and a second area, into which said displacement protrusion is inserted, having a groove width larger than said first area and extending to an end portion of said first member in the optical-axis direction.

13. A lens barrel comprising:

first and second lens units;

a first barrel member supporting said first lens unit and having a guide groove extending within a barrel wall;

a second barrel member supporting said second lens unit, and having a portion fitted and overlapped with said first barrel member and also a first protrusion provided in said overlapped portion and engaging with said guide groove, said first and second barrel members moving relative to each other while said protrusion is guided along said guide groove by action of an external force to thereby change an optical state, said second barrel member being provided with a second protrusion in a position displaced in a direction orthogonal to a direction in which the guide groove extends where the first protrusion engages the guide groove, and said second protrusion being in contact with said guide groove, thereby a play of said first protrusion with respect to said guide groove being absorbed.

14. The lens barrel according to claim 13, wherein at least one of the second protrusion and a portion of the first barrel member defining the guide groove is composed of an elastic member.

15. The lens barrel according to claim 13, wherein the first barrel member has at least one pair of guide grooves, and wherein the second barrel member has at least two displacement protrusions, the displacement protrusions inserted respectively into the guide grooves and provided in positions on the second barrel member in which directions of forces received from side surfaces of the guide grooves offset each other.

16. The lens barrel according to claim 13, wherein the first barrel member has at least one guide groove provided so that side surfaces thereof are parallel or perpendicular to the perpendicular direction in a main attitude of a camera.

17. The lens barrel according to claim 13, wherein the guide groove is a rectilinear advancement groove parallel to an optical axis, and the rectilinear advancement groove has a first area, into which the first protrusion is inserted, having substantially a same groove width as a width of the first protrusion, and a second area, into which the second protrusion is inserted, having a groove width larger than the first area and extending to an end portion of the first barrel member in the optical-axis direction.

* * * * *